Aug. 31, 1965

G. L. FLEMMERT 3,203,759

METHOD OF PREPARING SILICON DIOXIDE

Filed Nov. 1, 1961

3 Sheets-Sheet 1

$$SiF_4 + 2nH_2O \rightleftharpoons 4HF + SiO_2$$

3,203,759
METHOD OF PREPARING SILICON DIOXIDE
Gosta Lennart Flemmert, Hamngatan 22,
Nyashamn, Sweden
Filed Nov. 1, 1961, Ser. No. 149,349
Claims priority, application Sweden, Nov. 3, 1960,
10,583/60
6 Claims. (Cl. 23—182)

The present invention relates to a method of preparing from gaseous silicon fluorine compounds finely divided silicon dioxide having an average particle size of from 2 to 200 m$\mu$, preferably from 5 to 50 m$\mu$, and little or no conglomeration to form large aggregates.

It is known that silicon fluorine compounds, for example, silicon tetrafluoride and volatilized fluosilicic acid, can react in the gaseous phase with water vapor to form finely divided silicon dioxide of desirable particle size. The reaction can be carried out in many different ways. Thus, for example, as described in U.S. Patent No. 2,819,151, the silicon fluorine compound can be introduced into a flame of burning hydrocarbons or hydrogen gas, whereby silicon dioxide and hydrogen fluoride are obtained together with the exhaust gases formed during the combustion. Another method of carrying out the reaction, as described in U.S. Patent No. 2,535,036, is to mix in gaseous phase the silicon fluorine compound with superheated steam, whereby the fluorine compound is at least partly hydrolyzed, with the formation of finely divided silicon dioxide and hydrogen fluoride, according to the following reaction:

$$SiF_4 + n(2H_2O) \rightleftharpoons SiO_2 + 4HF$$

where $n$ is the multiplying factor by which the number of moles of water are multiplied when taken in excess of the stoichiometric molar amount, 2.

The thermodynamics of this reaction are such that it is quite difficult to carry out on a large scale, and thus it presents special problems usually not encountered with metal halides other than silicon fluorine compounds. The equilibrium constant for the above reaction has been calculated by F. A. Lanfesty, T. O. Farr and J. C. Brosheer (Ind. Eng. Chem. 44, 1448 (1952)) and I. G. Ryss (J. Phys. Chem. 14, 571 (1940)). According to Lanfesty et al.

Figure 1:
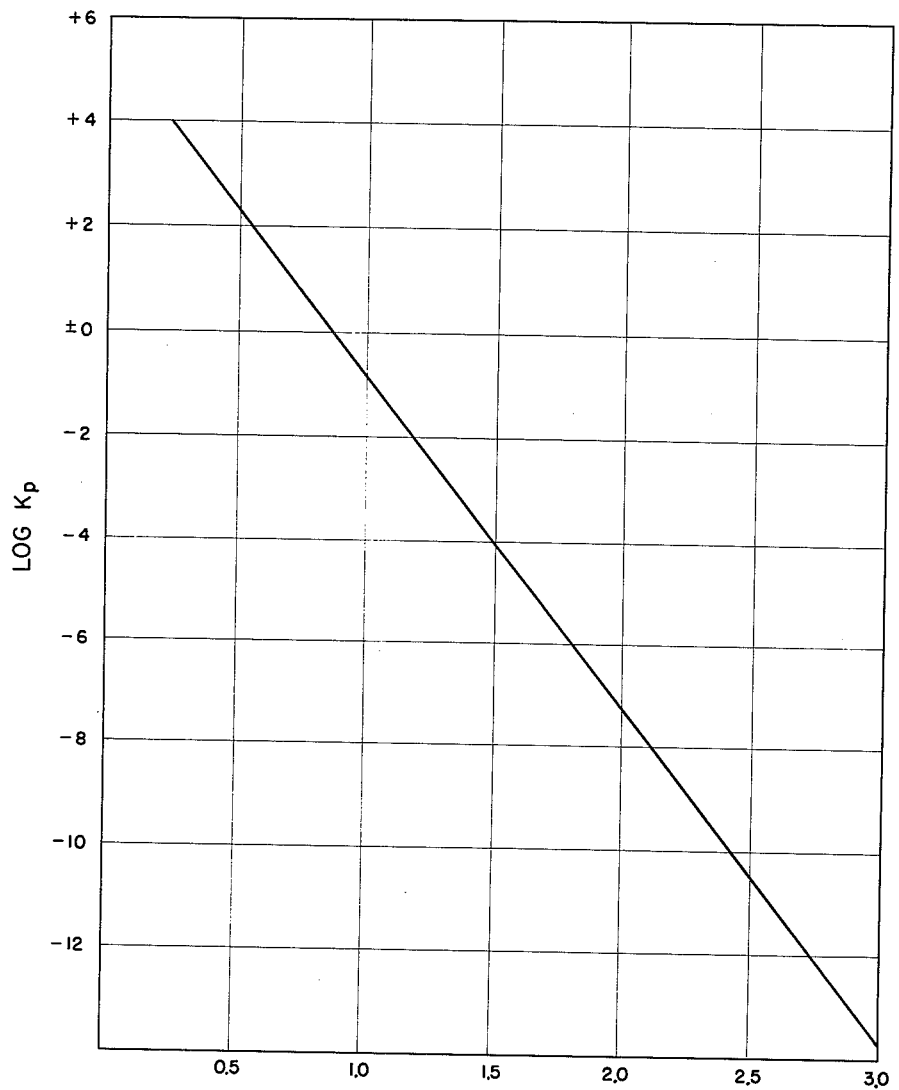
Figure 2:
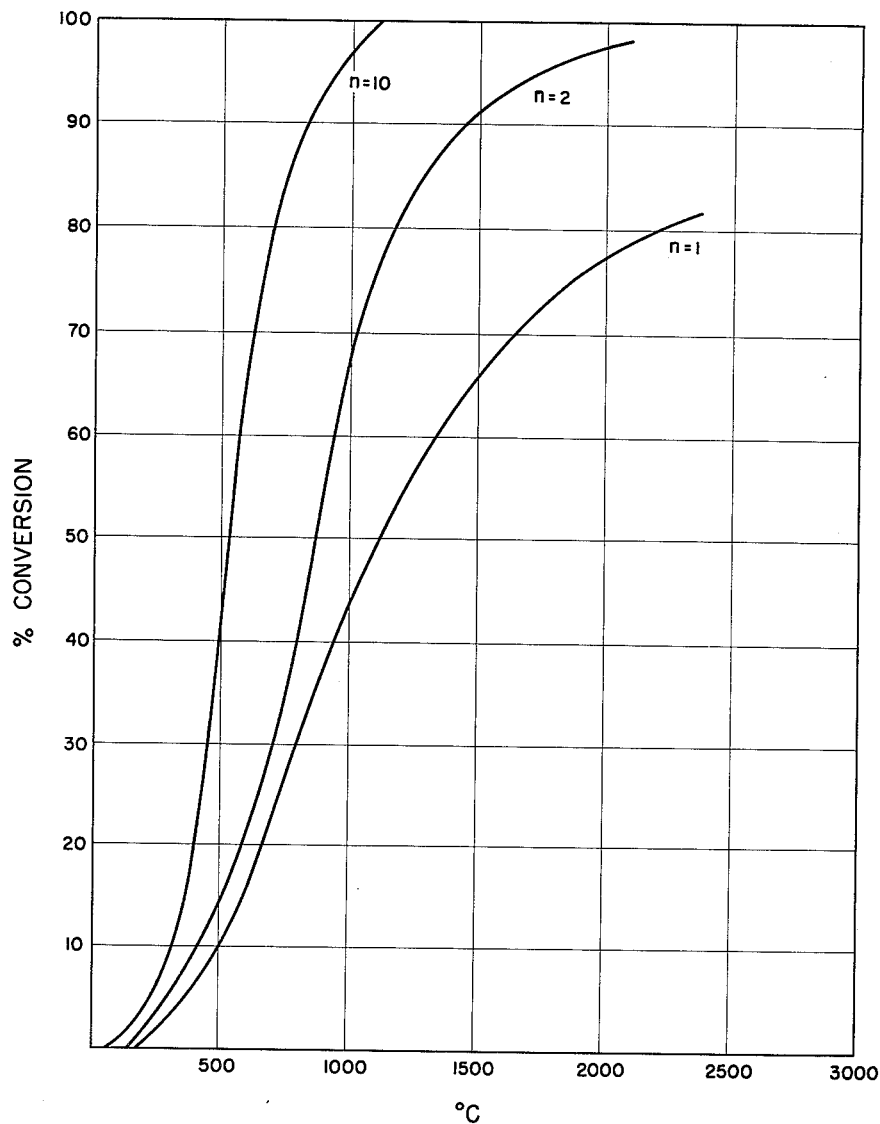

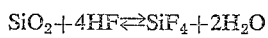

$$\log_p = 5,547 - \frac{6383}{T}$$

where $K_p$ is the equilibrium constant at atmospheric pressure and $T$ is the absolute temperature. The variation of the equilibrium constant with the temperature is shown diagrammatically in FIG. 1. From the above equation for the equilibrium constant, the degree of conversion for the above reaction can be calculated according to methods well known in physical chemistry. Calculations have been carried out for different temperatures and with $n$ in the above reaction being $=1$, $=2$ and $=10$, that is, with the stoichiometrically required amount of water vapor, with 100% excess of water and with a 10-fold excess of water. The results of these calculations are shown diagrammatically in FIG. 2.

As the diagram shows, high temperature and a large excess of water favor the conversion of silicon tetrafluoride to silicon dioxide. For example, 97% of the silicon tetrafluoride is converted at a temperature of 1000° C. if the excess of water is ten times larger than the amount which is required stoichiometrically, but the degree of conversion is only 43% when the stoichiometric amount of water is used. At a temperature of 400° C., the degree of conversion is 20% when $n=10$ and about 5% when $n=1$.

The calculations above lead one to expect what actually occurs in practice, and constitutes an important obstacle to the commercial production on a large scale of finely divided silicon dioxide from silicon fluorine compounds in the gaseous phase. If the gaseous reaction product mixture is cooled before separation of silicon dioxide and hydrogen fluoride, the reaction is reversed, and the finely divided silicon dioxide which is formed at high temperatures now reacts with the hydrogen fluoride, regenerating silicon tetrafluoride according to the reaction $$SiO_2 + 4HF \rightleftharpoons SiF_4 + 2H_2O$$

This reverse reaction becomes significant at temperatures below 600° C., and increases in rate as the temperature drops. Experiments have shown that the finely divided silicon dioxide, which has a very large surface area, rapidly reacts with the hydrogen fluoride at temperatures below 450° C. Thus, if the temperature of the reaction mixture is lowered between 600° C. by indirect cooling, the silicon dioxide will be converted to a great extent to silicon tetrafluoride, thus resulting in a low yield and an uneconomical process.

The reaction proceeds in the direction of silicon dioxide formation at 600° C. and over, and good yields of silicon dioxide can be obtained, but other difficulties arise. The gas containing hydrogen fluoride is highly corrosive at such high temperatures, and thus it is difficult to find a suitable construction material for the separators. In addition, the silicon dioxide particles are rapidly disproportionated at high temperatures, so that the larger particles grow larger whereas the smaller particles grow smaller and eventually disappear, so that a product of larger particle size is obtained which is less active and thus less valuable.

The difficulties described above have made it impossible to use silicon tetrafluoride and other silicon fluorine compounds in preparing finely divided silicon dioxide, though such silicon fluorine compounds are available in large quantities as cheap by-products.

In accordance with this invention, silicon dioxide as obtained by the vapor phase reaction of silicon fluorine compounds and water can be maintained in active form as particles of from 2 to 200 m$\mu$ in size by diluting the mixture of gas by-products and suspended silicon dioxide from the reaction zone with an inert gas having a lower temperature than that of the reaction mixture and in an amount sufficient to reduce the reaction mixture temperature to below 600° C., and preferably to within the range from 350 to 575° C., but above the dew point of the diluted mixture. The silicon dioxide is then separated from the cooled diluted suspension. A good yield of high quality silicon dioxide is obtained, a surprising result in view of the reversibility of the reaction at such temperatures.

For cooling the reaction mixture, any inert gas can be used, i.e., any gas which will not react with any of the components desired to be recovered from the reaction mixture. Suitable gases are exemplified by air, water vapor, nitrogen, carbon dioxide, neon, helium, argon and like rare gases, and exhaust gases from combustion processes. The preferred diluent is the exhaust or by-product gases from the reaction after finely divided silicon dioxide has been separated therefrom, and they have been cooled to a suitable temperature, for the reason that no lowering of the concentration of the gaseous components occurs, thereby facilitating recovery of hydrogen fluoride and unreacted silicon tetrafluoride therefrom, if such be desired.

The quantity of cooling gas admixed and its temperature are so adjusted as to obtain the temperature to which

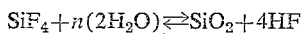

the reaction mixture is to be brought. These variables can thus be controlled within wide limits, according to the desired degree of cooling. It has been found in practice that from one to eight times the volume of the reaction mixture gases is the optimum range of operation. The quantity of gas admixed is suitably such that the resulting temperature is below 600° C. but above the dew point of the diluted mixture. Within this temperature range it is comparatively easy to overcome the practical problems involved in the silicon dioxide separation step, such as corrosion and mechanical-strength problems, for example.

The mode of admixture of cooling gas is not critical, and can be carried out in a variety of ways. Thus, for instance, in using the process and apparatus described in U.S. Patent No. 2,819,151, for instance, at column 5 line 67 through column 6 line 37, the gas may be introduced behind the flame in a manner to form a curtain of gas surrounding the same. This curtain may be directed either parallel to the direction of flow of the flame, or tangentially thereto, resulting in a vortex action.

It has been found particularly advantageous to introduce the cooling gas at the end of the reaction zone. This results in the advantage that the reaction zone itself will not be cooled or disturbed, whereas the reaction product will be rapidly cooled down after the reaction. In order to obtain most effective mixing, the cooling gas may be introduced through suitably shaped nozzles.

After admixing the cooling gas, silicon dioxide separation can be carried out by means of a mechanical precipitator. The term "mechanical precipitator" here denotes all types of precipitators except filters and electrostatic precipitators. As examples of mechanical precipitators, there can be mentioned cyclones and centrifugal precipitators, impingement precipitators and gravimetric precipitation chambers. It has not been possible to separate the finely divided silicon dioxide obtained after cooling and dilution in accordance with this invention by means of filters or electrostatic precipitators. Teflon polytetrafluoroethylene or ceramic filters give a recovery of silicon dioxide of as low as 2 to 20%, and the process is therefore uneconomical if these are used. Electrostatic precipitators also give poor recovery of silicon dioxide and the process again is uneconomical.

The plant comprises a burner 1 arranged in a combustion chamber 2 and having supply conduits 3, 4, 5 for combustible gas, silicon tetrafluoride and air. The cooling and diluting gas is introduced into the combustion chamber 2 through a conduit 6. Three series-connected cyclones 7, 8 and 9 are provided within which finely divided silicon dioxide is separated, and discharged through the common conduit 10. Exhaust gases are withdrawn at the top of cyclones 7 and 8 and conducted to the top of the next cyclones, 8 and 9, respectively, through conduits 11 and 12, from the last cyclone 9 the exhaust gases are transferred to an absorption tower (not shown), through a conduit 13. The desired proportion of the exhaust gases as required for cooling is tapped off through a conduit 14, and transferred to a gas cooler 15 which in its turn communicates through a conduit 16 with a blower 17 serving to supply cooling and diluting gas to the combustion chamber through the above-mentioned conduit 6.

Figure 3:
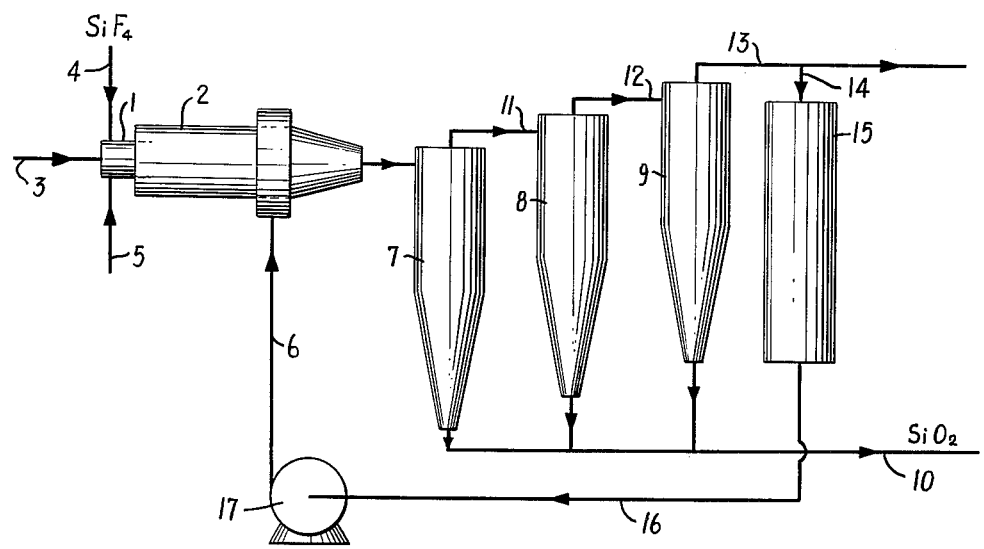

FIGURE 3 illustrates in diagrammatic form a suitable plant for carrying out the process of the invention. The kg. silicon dioxide of an average particle size of 12 m$\mu$ lowing examples.

*Example I*

A continuous flow of 1200 litres/minute of a combustible gas consisting of 80% of hydrogen, 15% of methane and 5% of ethane was admixed with 4240 litres/minute of air and 330 litres/minute of silicon tetrafluoride, and was supplied with 1410 litres/minute of air to the burner of the plant shown in FIGURE 3. The mixture was burnt, whereby the silicon tetrafluoride was converted into finely divided silicon dioxide and hydrogen fluoride. The reaction products from the flame were admixed with exhaust gases from the reaction which had been freed from their content of silicon dioxide, cooled to 150° C. in the cooler 15, and returned to the burner through conduit 6. The amount of cooling gases admixed was 3.2 times the quantity of gases formed in the reaction, resulting in a temperature of the mixture of 550° C. as it emerged from the burner. The gaseous mixture thus obtained was passed through the three series-connected cyclones 7, 8 and 9 in which the finely divided silicon dioxide was separated and collected at 10. 34.6 kg. silicon dioxide of an average particle size of 12 m$\mu$ were obtained per hour. This is 69.9% of the theoretical yield. The exhaust gases in excess were transferred via conduit 11 to an absorption tower, in which the hydrogen fluoride and unreacted silicon tetrafluoride were recovered.

*Example II*

The procedure of Example I was repeated except that no exhaust gases from the reaction were recycled but instead 26 m.³/minute air having a temperature of 100° C. were introduced through conduit 6. The temperature of the resulting gaseous mixture was 560° C. In the cyclones 7, 8 and 9 silicon dioxide was precipitated and collected at 10. 33.4 kg. silicon dioxide of an average particle size of 14 m$\mu$ were obtained.

*Example III*

The same amounts of gases were fed to the burner as in Example I. Through conduit 6 exhaust gases from the cooler 15 were returned to the combustion chamber. The amount of cooling gases was 8 times the quantity of gases formed in the reaction, and the temperature of the gases was 100° C. resulting in a temperature of the mixture of 290° C. In the cyclones 29.5 kg. silicon dioxide were precipitated per hour. The particle size of the product was 11 m$\mu$.

*Example IV*

A continuous flow of 1200 litres/minute of the same combustible gas as mentioned in Example I was admixed with 330 litres/minute of silicon tetrafluoride, 2000 litres/minute of air and 450 litres/minute of oxygen. A mixture of 500 litres/minute of air and 200 litres/minute of oxygen was also supplied to the burner of the plant shown in FIGURE 3. Through conduit 6 cooled reaction gases were returned to the combustion chamber. The temperature of the cooling gases was 130° C. and the amount was 2.2 times the quantity of gases formed in the reaction resulting in a temperature of the mixture of 600° C. Per hour 35.7 kg. silicon dioxide were separated in the cyclones and collected at 10. The average particle diameter of the product was 187 m$\mu$.

I claim:

1. A process for recovering at temperatures below about 600° C. finely-divided silicon dioxide having an average particle diameter within the range of 2 to 200 m$\mu$ from the hydrogen fluoride-containing gaseous reaction product obtained by reacting silicon tetrafluoride with water in the gaseous phase at temperatures above about 600° C. while inhibiting reverse reaction of the silicon dioxide with hydrogen fluoride to produce silicon tetrafluoride and water, which comprises (1) diluting the reaction product with an inert gas having a lower temperature than the reaction product in a volume to inhibit said reverse reaction of silicon dioxide with hydrogen fluoride, simultaneously reduce the temperature of the reaction product to below 600° C., and thereby maintain the average silicon dioxide particle size diameter within the range from 2 to 200 mμ; and (2) recovering such silicon dioxide from the reaction product.

2. A process in accordance with claim 1 in which the silicon dioxide is recovered from the reaction product by a mechanical dust separator.

3. A process in accordance with claim 1 in which the inert gas is the cooled mixed gases present in the gaseous reaction product.

4. A process in accordance with claim 1 in which the gaseous reaction product is obtained by reacting silicon tetrafluoride with water in a flame.

5. A process in accordance with claim 1 which comprises diluting the gaseous reaction product with from 1 to 8 volumes of the inert gas.

6. A process in accordance with claim 1 in which the inert gas is at a temperature higher than the dew point but lower than 500° C.

References Cited by the Examiner

UNITED STATES PATENTS

| | | | |
|---|---|---|---|
| 2,347,496 | 4/44 | Merskat et al. | 23—182 |
| 2,437,334 | 3/48 | Roetheli | 23—1 X |
| 2,631,083 | 3/53 | Engelson et al. | 23—182 |
| 2,791,490 | 5/57 | Wilcox | 23—182 |
| 2,819,151 | 1/58 | Flemmert | 23—182 |
| 3,105,742 | 10/63 | Allen et al. | 23—202 |
| 3,130,008 | 4/64 | Stokes et al. | 23—182 |

FOREIGN PATENTS

| | | |
|---|---|---|
| 1,047,756 | 12/58 | Germany. |
| 20,697 of 1907 | 9/08 | Great Britain. |

MAURICE A. BRINDISI, *Primary Examiner.*